Feb. 4, 1941.  A. H. J. DE LASSUS SAINT GENIES   2,230,938
METHOD OF OBTAINING COLOR PHOTOGRAPHS
Filed Dec. 29, 1936
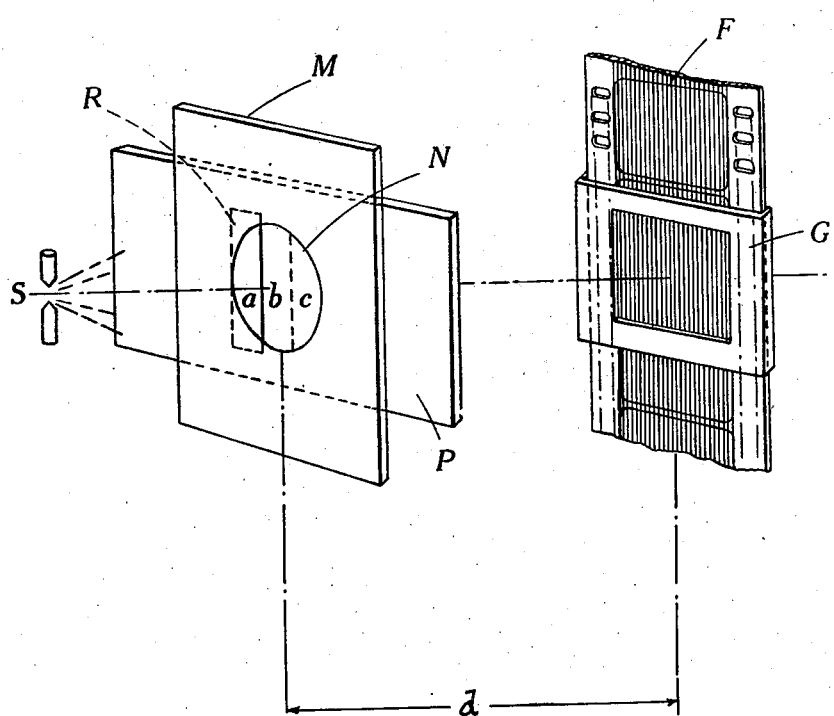
INVENTOR.
Anne Henri Jacques
de Lassus Saint Genies.
BY
Stone, Boyden & Mack.
ATTORNEYS.

Patented Feb. 4, 1941

2,230,938

UNITED STATES PATENT OFFICE 2,230,938

METHOD OF OBTAINING COLOR PHOTOGRAPHS

Anne Henri Jacques de Lassus Saint Genies, Versailles, France

Application December 29, 1936, Serial No. 118,123
In France January 4, 1936

2 Claims. (Cl. 95—2)

The present invention relates to a method of obtaining images in color, which is applicable, for instance, to photography on paper or to cinematography on a lenticular film presenting at the same time the advantages of lenticular plates from the point of view of the low cost, the simplicity of view taking and copying, etc. and the advantages of tinted copies which can be observed directly or projected by any optical system and without color filters.

It consists essentially in first obtaining by known means on an ordinary lenticular support an original photograph consisting of several monochrome images in black and white of a subject in color, or a lenticulated copy of such an original, and in separately and successively tinting the partial microscopic images in each of the elementary chambers of the lenticulations. This tinting operation is selectively effected by means of photo-chemical methods known per se, but in combination with the particular properties of lenticular supports, which, as is known, permit of separately illuminating each of the partial images by means of suitably directed luminous rays.

This illumination is similar to that employed in the reversal of photographic images by the "second exposure" method but instead of the whole surface of the emulsion being illuminated only one monochrome image is illuminated at a time. The monochrome images are illuminated successively and the illumination of each individual monochrome image is hereinafter referred to as a selective illumination.

This selective illumination may, for example, be carried out by the known method illustrated in the accompanying drawing. Referring to the drawing the film F is guided by the gate G; the light source S illuminates an unpolished glass plate N arranged in a fixed opaque screen M. The distance d between the film F and the screen M and the form of the opening N correspond to the distance and the form of the color filter which has been used in the preparation of the film. A movable screen P having an opening R is arranged adjacent the fixed screen M. The opening R uncovers first the part a which corresponds to the first monochrome image, next the part b which corresponds to the second monochrome image and so on.

The selective physico-chemical coloring processes used in carrying out the invention may for instance, be similar to those known in connection with tinting by impregnation, decoloration, rendering insoluble, mordanting, toning etc. of the photographic images.

As in the ordinary case of copying on emulsion with a lenticular support, the copy images composed of the juxtaposition of microscopic images in the elementary chambers of the lenticulations are at first obtained, but according to the present invention, each of these microscopic images finally stands out on a suitably colored background instead of standing out on a white or colorless background. Under these conditions, if the final image is copied on an emulsified paper covered with a lenticular support, the image in color may be observed directly; in the case of a film, it may be observed and projected without any optical device or filter.

A method of carrying out the invention will now be described starting with a developed but not fixed positive image. First of all, the silver deposit of this positive copy is transferred into a stable black compound, that is one not affected by subsequent physico-chemical operations. This can for instance be effected by known toning baths.

The stable black colorant may be formed for example from the mixture of Lumière and Seyewetz, which is very similar to the known mixture of Christensen comprising crystallised copper sulphate, trimetallic potassium citrate, citric acid and ammonium thiocyanate. Alternatively the colorant may be formed from indoxyl, mixed if desired with thioindoxyl. When these specific substances are used development may be effected with pyrogallic acid.

Then selective exposures through the lenticulations of the copy are effected in the same way as in the previous example. After each exposure the silver halogen salt existing in the gelatin, is developed and treated in a coloring bath, so that it absorbs a suitable dyestuff which is inalterable by the following operations.

For this purpose known methods of development can be used which directly produce colored images. On the other hand, use may be made, for example, of known toning methods. Whatever the mode of successive treatments of the partial images, a complete and correct polychrome coloration is thus obtained of the parts of the emulsion which would have constituted the transparencies or the whites if the copy had simply been developed and fixed before tinting.

In order to remove the traces of silver halogen salt which would not have been reduced during successive secondary developments and which might have existed in a detrimental manner, they may be eliminated by a suitable solvent.

Each of the above successive operations produces, with each new colored partial image, a new blackening due to new reductions of silver, so that finally practically all the silver of the emulsion is reduced and a completely opaque image is obtained which cannot be observed. The metallic silver is now dissolved by any appropriate solvent, for instance, by Farmer's bath, and the colored image appears. This image consists of the black dyestuff corresponding to the primary image, developed and transformed as stated above, and of the different colored dyestuffs which have been successively introduced into the gelatine during the subsequent operations.

This process has the advantage of producing on the paper or on the film images which have no granulations of silver particles.

In all cases it is possible to remove the lenticulations which are no longer necessary, either by crushing the same when the material is in the warm condition or by covering the lenticular support with a layer of varnish of suitable refractive index.

I claim:

1. Method of obtaining a photograph in color which consists in first obtaining by the lenticular process of photography a latent primary image composed of a plurality of monochrome components, developing the latent primary image to give a positive primary image in black and white, treating the photograph chemically to produce in the vicinities of the silver reduced in the development a stable black compound, then subjecting without fixing of the sensitive salts each monochrome component successively to treatment including an exposure made selective by the lenticular support and a development followed by a toning of the obtained black negative image producing a color corresponding to that which is finally to be obtained in the particular monochrome component treated, the density of the color produced being proportional to the quantity of silver reduced during the development.

2. Method of coloring a lenticular film bearing a positive primary image composed of a plurality of monochrome components recorded and developed in black and white which consists in treating the photograph chemically to produce in the vicinity of the silver reduced in the development a stable black compound, subjecting without fixing of the sensitive salts each monochrome component successively to treatment including an exposure made selective by the lenticular support, and a development followed by a toning of the obtained black negative image producing a color corresponding to that which is finally to be obtained in the particular monochrome component treated, the density of the color produced being proportional to the quantity of silver reduced in the development.

ANNE HENRI JACQUES
DE LASSUS ST. GENIES.

CERTIFICATE OF CORRECTION.

Patent No. 2,230,938. February 4, 1941.

ANNE HENRI JACQUES de LASSUS SAINT GENIES.

It is hereby certified that error appears in the printed specification of the above numbered patent requiring correction as follows: Page 1, second column, line 20, for the word "transferred" read --transformed--; and that the said Letters Patent should be read with this correction therein that the same may conform to the record of the case in the Patent Office.

Signed and sealed this 29th day of April, A. D. 1941.

(Seal)

Henry Van Arsdale,
Acting Commissioner of Patents.